Figure 1:
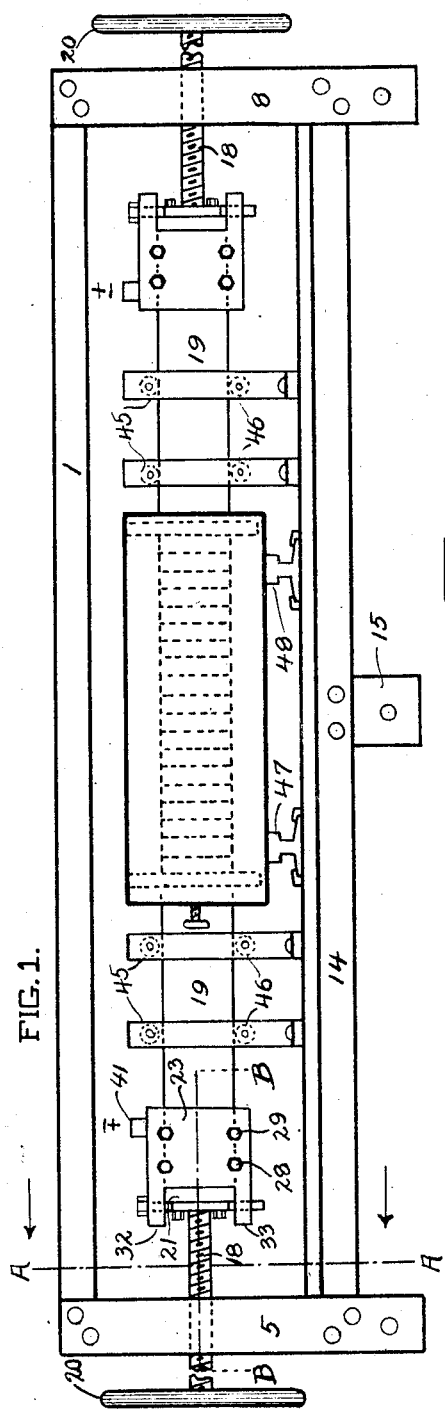

J. W. BROWN.
METHOD OF HEATING CARBON ARTICLES IN INDEPENDENT UNITS.
APPLICATION FILED JUNE 6, 1912.

1,198,616.

Patented Sept. 19, 1916.
2 SHEETS—SHEET 1.

WITNESSES
H. G. Grover
V. A. Clark

INVENTOR
JOHN W. BROWN
BY Ira J. Adams
ATTORNEY

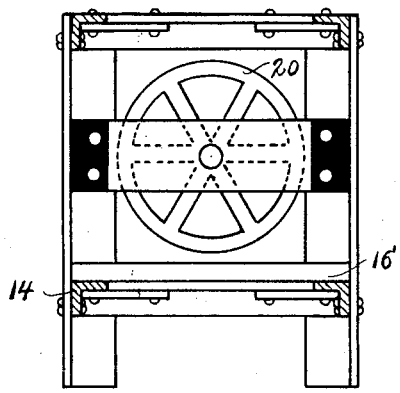
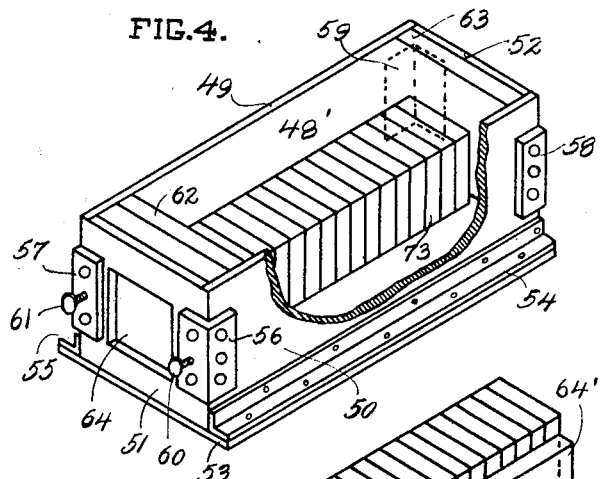
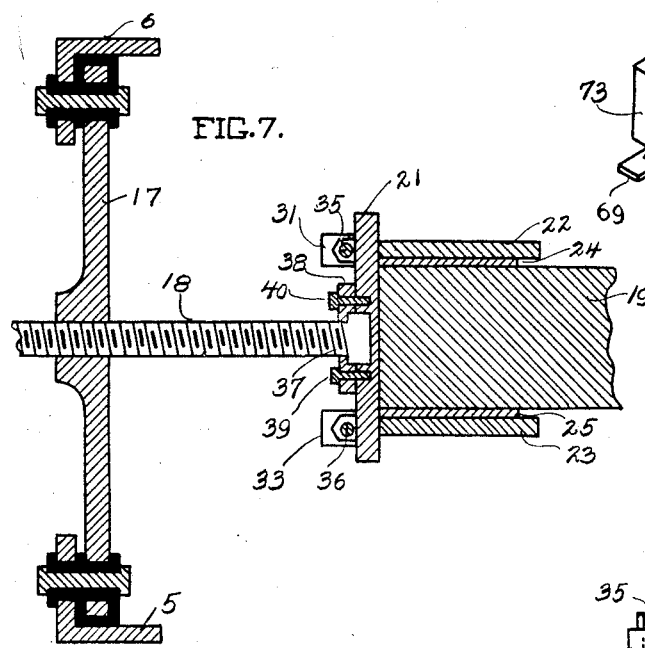
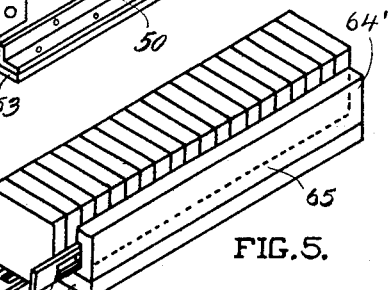
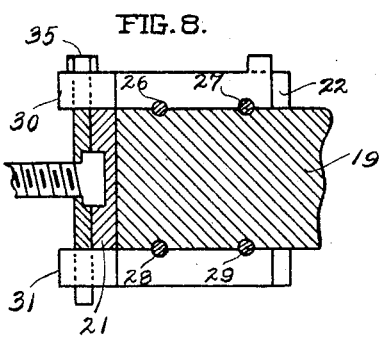

UNITED STATES PATENT OFFICE.

JOHN W. BROWN, OF LAKEWOOD, OHIO, ASSIGNOR TO NATIONAL CARBON COMPANY, OF CLEVELAND, OHIO, A CORPORATION OF NEW JERSEY.

METHOD OF HEATING CARBON ARTICLES IN INDEPENDENT UNITS.

1,198,616.  Specification of Letters Patent.  Patented Sept. 19, 1916.

Application filed June 6, 1912. Serial No. 702,118.

*To all whom it may concern:*

Be it known that I, JOHN W. BROWN, a resident of Lakewood, in the county of Cuyahoga, in the State of Ohio, have invented new and useful Improvements in the Method of Heating Carbon Articles in Independent Units, of which the following is a clear and exact description.

This invention relates to the heating and graphitizing of carbon products.

One object of the invention is to heat carbon articles or products in a convenient, expeditious manner so that the time required for the treatment is reduced to a minimum.

Another object is to use one electrical apparatus to heat one group of articles while the previously heated ones are cooling down so that the articles can be treated by a continuous process.

Another object is to facilitate the heating of small groups in a short time so that small orders can be shipped without the delay heretofore considered unavoidable.

Other objects will appear in the appended description.

My invention is a departure from former methods of heating or polymerizing carbon. The usual practice was to heat the carbon articles or products in large expensive furnaces with heavy brick walls. The articles to be heated for the purpose of polymerizing them or for other purposes were placed in the furnace with layers of graphite or coke partially or entirely enveloping them. Some of the furnaces had cumbersome brick roofs, while others were open at the top. The latter type required a deep layer of loose graphite or coke on top of the articles to act as a heat insulating medium. The articles were heated from ten hours to two or three days and a large loss of heat resulted from radiation and conduction. When the process was thought to be complete, it was necessary to remove the brick roof and deep layers of heat insulating material before the articles could be taken out. In the Acheson process of graphitization the sides of the furnace are also removed. But before the furnace could be opened it had to stand for a long time to allow it to cool down sufficiently to handle the material inside. It will at once be apparent that the old processes are expensive and cumbersome and result in the equipment lying idle the greater part of the time.

My invention consists in heating the articles in small units. They are grouped together in forms or boxes and placed successively between the electrodes for heating. I use a high current density so that a very intense heat is obtained in a few minutes. When one group is heated sufficiently it is removed and another group is substituted. The electrical heating apparatus is thus in continuous use. The heated articles, when removed from the heating zone, are dumped with the heat insulating material into a receptacle and the box can be immediately filled with another group of articles. The heating is so rapid that the box does not become heated to any extent.

The method is not limited to any specific treatment of carbon articles, but can be used to heat carbon articles for any purpose. It can be used to polymerize them by converting them into graphite or any other form of carbon.

The method can be carried out by various forms of apparatus, but I have illustrated an apparatus which I consider to be well suited for the purpose. Other forms could also be used with good results.

Figure 2:
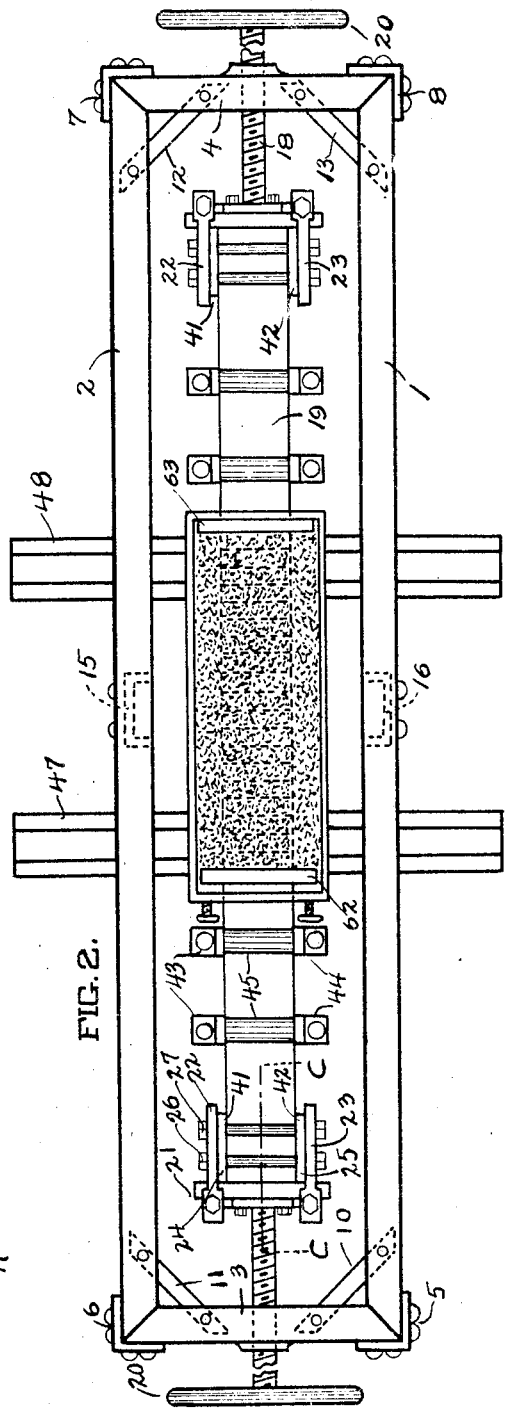

In the drawings: Figure 1 is a side elevation of the apparatus which may be called a furnace, although it has no resemblance to the usual type of furnace. Fig. 2 is a top view of the same. Fig. 3 is a sectional view taken on the line A—A of Fig. 1 looking in the direction indicated by the arrows. Fig. 4 is a view of the box containing the articles to be treated showing them clamped in place. Fig. 5 is a view of the device used to place the carbon articles in the box of Fig. 4. Fig. 6 is a view of the form shown in Fig. 5 before the articles are placed therein. Fig. 7 is a sectional view of parts of the furnace frame and electrode taken on the line B—B of Fig. 1. Fig. 8 is a sectional view of part of the electrode taken on the line C—C of Fig. 2.

Referring to Figs. 1 and 2, the furnace frame can be made of wood or any other material, though it has been shown as being made of angle irons. At the top there are two angle irons 1 and 2 joined to similar irons 3 and 4 at the ends. The angle irons may be joined together in any way, but I have shown them as being mitered so as to form a neat joint, and riveted or jointed to four posts 5, 6, 7 and 8. In order to make the frame more rigid the irons may be braced by the braces 10, 11, 12 and 13.

The lower frame, one member of which 14 is shown in Fig. 1 is identical in all respects to the upper frame. I have shown two metal supports 15 and 16 fastened to the lower frame at the middle. The legs or supports of the furnace may be bolted to posts or pillars, or they may be simply fastened to a table or floor as desired. The lower frame is preferably covered with a layer of some non-conducting substance 16' such as transite board, composed of asbestos and cement. Such material forms a very strong board and will answer well the purpose in this arrangement.

By referring to Fig. 3 and Fig. 7, it will be seen that the member 17 is joined to the corner posts 5 and 6, and insulated therefrom. The insulation may consist of fiber board or any other well known suitable non-conducting material. A screw 18 connected to the electrode 19 passes through the threaded opening in the member 17. The screw is revolved by any means, but I have shown a wheel 20 which is insulated therefrom in any way. A good way to do this is to construct the spokes of wood. The electrode may be joined in any manner to the screw 18. I have shown a metal end plate 21 which rests against the end of the electrode 19, and is held in place by two plates 22 and 23. In order to make good electrical connection with the electrode, two copper plates 24 and 25 are clamped by the plates 22 and 23 against the electrode. The plates are held firmly by the bolts 26, 27, 28 and 29. Grooves are preferably cut in the edge of the electrode to admit of the passage of the four clamping bolts. The clamping plates 22 and 23 have two ears each 30, 31 and 32, 33 which extend past the end of the electrodes sufficiently to enable the pins 35 and 36 to be passed behind the plate 21 through holes in the ears of the plates.

The screw 18 has a circular head 37 bearing in a circular cavity in the plate 21. The plate 38, having a corresponding cavity and a hole for the passage therethrough of the screw 18, is fastened to the plate 21 by appropriate means such as a screw 39 and a screw 40. Lugs 41 and 42 on the copper plates 24 and 25 are provided so that conducting cables can be connected thereto. These are marked $\pm$ and $\mp$ on the drawings to indicate that they are the terminals. The electrode is held in place and properly guided by pairs of straps 43 and 44 joined together by pairs of rollers 45 and 46 above and below the electrode. The rollers permit of the electrode being moved back and forth by means of the operating wheel 20 with minimum friction. The straps are secured to the board 16' by appropriate screws or bolts. The rollers 45, 46 and the straps 43, 44 could be formed of iron but since they would form a closed magnetic circuit around the electrode, the hysteresis loss might be high enough to cause trouble. If either the straps or the rollers were made of non-magnetic metal this trouble would be avoided. The trouble could also be obviated by using some material such as transite or fiber for this purpose.

The right hand side of the furnace in all its details is exactly identical with that of the left hand which has just been fully described, so that it is unnecessary to allude to it in particular. The parts of the electrode and its connections are numbered similarly to those on the right.

Two iron rails 47 and 48 are fastened to the board 16' to serve as supports for the box which contains the articles to be heated and compressed.

The box shown in Fig. 4 consists of two sides 49 and 50 joined to two end pieces 51 and 52 and the bottom 53. These boards are preferably made of transite board or other materials that would serve the purpose equally as well. The box can be made stronger by means of angle irons 54 and 55 joined to the bottom and sides. End plates 56 and 57, 58 and 59 may be fastened to the corners where the sides join the ends in order to further strengthen the box. The strengthening irons used on the box are not absolutely necessary, and in order not to render the showing confusing in Figs. 1 and 2 the box is there shown without them.

For a purpose to be later described two screws 60 and 61 are threaded through irons 56 and 57 and the member 51 to press against the conducting block 62. It is not necessary to have similar screws on the other end of the box, hence the conducting block 63 bears against the end member 52. The two end members 51 and 52 have openings therein to receive the two electrodes 19. The opening in the board 52 is not shown in Fig. 4, but it is identical with that in the end 51.

In order to facilitate the placing of the brushes in the box 48', a device 64' shown in Fig. 6 may be used. This consists of two boards 65 and 66 fastened together to form an angle. These boards may be made of any materials, but wood is the most convenient. Two slots 67 and 68 in these boards receive members 69 and 70 in a loose fit. Screws or pins 71 and 72 pass through slots in the members 69 and 70, and hold them in place.

The use of the apparatus disclosed will now be given in detail. The articles to be heated are shown as blocks 73. These are placed side by side in the angled form 64' as shown in Fig. 5 with the cracks or laminations approximately perpendicular to the direction of the electrodes. By referring to Fig. 5, it will be noted that the end block 73 extends past the boards 65 and 66, and is substantially flush with the ends of the members 69 and 70.

The device 64′ with the brushes therein is taken by the operator and placed in the box 48′ and held so that the center line of the brushes is approximately in line with the center line of the blocks 62 and 63, and then the screws 60 and 61 are manipulated forcing the block 62 against the column of carbon articles, which clamps them firmly together against the block 63. The members 69 and 70 slide in the slots 67 and 68, and permit the carbon blocks to be clamped in place without clamping the device 64′ at the same time. The latter is then removed by the operator.

If desired the box may be placed in the furnace and the current turned on without covering the articles with any heat insulating material. It is preferable, however, to fill the space in the box 48′ by some heat insulating material and in practice I have found that broken pieces of charcoal serve the purpose well. A bag of broken charcoal can be emptied into the box 48′ and it will flow into the space at the sides and below the carbon blocks 73. Sufficient charcoal should also be placed on top to cover the carbon blocks well.

The box 48′ with the carbon articles and the heat insulating material is then placed by the operator on the rails 47 and 48 of the furnace and slid into place in proper alinement with the two electrodes 19. The wheels 20 are then manipulated to push the electrodes through the openings in blocks 62, 63 to press them against the carbon articles and more firmly press them in contact with each other. The current is then turned on. The current density may be any value desired depending upon the results to be accomplished. For graphitizing, I have used current densities as high as 5000 amperes per square inch. An average density of 1000 amperes per square inch is sufficient to graphitize in a very short time articles made of certain forms of carbon.

When the heating is completed the current is turned off and the electrodes are drawn from the opening in the end plates of the box 48′. The box is then removed and the contents dumped into a receptacle. Another box can have been filled by the one operator or by others if more are needed, so that the furnace can be kept almost continually in operation.

While the use of the device 64′ is very convenient in placing the carbon articles in place in the box 48′, it is not necessary to use this scheme alone. The box could be filled up with a proper amount of charcoal and the articles could be placed in between the electrodes on top of the charcoal. I prefer, however, to use the device 64′.

The method of heating in independent units is not limited to the specific process described. The articles need not necessarily be heated by sending the electric current through them. They could obviously be heated by external heat produced either by the electric current passing through a separate resistor, or by gas or other well known heating means. While I have found it advantageous to heat the articles under pressure, the method can be used without using pressure if desired. The articles could also be packed in the form in the same manner as articles are packed in furnaces by the Acheson process, that is, with a layer of granular coke or graphite between them. This would be an improvement over the old processes, but it would not give as good results as when the articles are placed in contact and put under pressure.

Having described my invention what I claim is:

A method of operating electric furnaces of the resistance type which comprises forming a movable receptacle of the body portion of the furnace, moving the said receptacle portion from its operating position and electrodes and charging the furnace, moving the said receptacle portion back to the operating position, connecting the electrodes thereto and operating on the material therein, and then moving the receptacle portion and discharging the product formed substantially as set forth.

In testimony whereof I have hereunto signed my name in the presence of two witnesses.

JOHN W. BROWN.

Witnesses:
I. J. ADAMS,
H. G. GROVER.